(12) United States Patent
Kim et al.

(10) Patent No.: US 9,493,593 B2
(45) Date of Patent: Nov. 15, 2016

(54) ELASTIC DIENE TERPOLYMER AND PREPARATION METHOD THEREOF

(71) Applicant: LG CHEM, LTD., Seoul (KR)

(72) Inventors: Sun Keun Kim, Daejeon (KR); Sung Ho Park, Daejeon (KR); Sung Cheol Yoon, Daejeon (KR); Jun Seok Ko, Daejeon (KR); Soo Young Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 70 days.

(21) Appl. No.: 14/442,527

(22) PCT Filed: Jun. 30, 2014

(86) PCT No.: PCT/KR2014/005811
§ 371 (c)(1),
(2) Date: May 13, 2015

(87) PCT Pub. No.: WO2014/209085
PCT Pub. Date: Dec. 31, 2014

(65) Prior Publication Data
US 2016/0280823 A1    Sep. 29, 2016

(30) Foreign Application Priority Data

Jun. 28, 2013  (KR) .................... 10-2013-0075873
Apr. 4, 2014   (KR) .................... 10-2014-0040551
Apr. 21, 2014  (KR) .................... 10-2014-0047679
Jun. 27, 2014  (KR) .................... 10-2014-0080039

(51) Int. Cl.
*C08F 210/18*   (2006.01)
*C08F 236/20*   (2006.01)

(52) U.S. Cl.
CPC .......... *C08F 210/18* (2013.01); *C08F 236/20* (2013.01); *C08F 2500/09* (2013.01)

(58) Field of Classification Search
CPC . C08F 210/18; C08F 236/20; C08F 2500/09
See application file for complete search history.

(56) References Cited

U.S. PATENT DOCUMENTS

| 5,229,478 A | 7/1993 | Floyd et al. |
| 5,902,867 A | 5/1999 | Muskens et al. |

(Continued)

FOREIGN PATENT DOCUMENTS

| CN | 1150809 A | 5/1997 |
| CN | 1224433 A | 7/1999 |

(Continued)

OTHER PUBLICATIONS

Search Report issued by the European Patent Office in Appl'n No. 14818626.5, dated Apr. 29, 2016.

(Continued)

*Primary Examiner* — Rip A Lee
(74) *Attorney, Agent, or Firm* — Dentons US LLP

(57) ABSTRACT

The present invention relates to a long-chain branched elastic terpolymer capable of satisfying excellent processability and elasticity (flexibility) at the same time, which is obtained in the presence of a Group IV transition metal catalyst, and a preparation method thereof. The elastic terpolymer is a copolymer of ethylene, an alpha-olefin having 3 to 20 carbon atoms, and a diene, wherein
i) its weight average molecular weight measured by GPC is 100,000 to 500,000, and
ii) its LCB Index which is a ratio of $1^{st}$ harmonics of storage modulus to $5^{th}$ harmonics of storage modulus measured at 125° C. using a rubber process analyzer according to a LAOS (Large Angles of Oscillation and high Strains) method has a positive value.

18 Claims, 1 Drawing Sheet

(56) References Cited

U.S. PATENT DOCUMENTS

| | | | |
|---|---|---|---|
| 6,369,176 B1 | 4/2002 | Laughner et al. | |
| 6,403,520 B1 | 6/2002 | Hamed et al. | |
| 6,545,088 B1 | 4/2003 | Kolthammer et al. | |
| 7,750,104 B2 | 7/2010 | Cady et al. | |
| 8,748,547 B2* | 6/2014 | Park | C08F 10/00 526/160 |
| 8,946,362 B2* | 2/2015 | Kum | C08F 10/00 526/132 |
| 9,315,605 B2* | 4/2016 | Lee | C08F 210/06 |
| 2004/0087750 A1 | 5/2004 | Agarwal et al. | |
| 2007/0225158 A1 | 9/2007 | Lee et al. | |
| 2012/0108772 A1 | 5/2012 | Lee et al. | |
| 2012/0172548 A1* | 7/2012 | Cho | C08L 23/08 526/64 |
| 2012/0259077 A1 | 10/2012 | Ha et al. | |
| 2015/0274874 A1* | 10/2015 | Yoon | C08F 236/20 526/134 |
| 2015/0299361 A1* | 10/2015 | Yoon | C08F 210/18 526/118 |

FOREIGN PATENT DOCUMENTS

| | | |
|---|---|---|
| CN | 1254350 A | 5/2000 |
| CN | 1432046 A | 7/2003 |
| CN | 101277987 A | 10/2008 |
| CN | 101580559 A | 11/2009 |
| CN | 101679561 A | 3/2010 |
| CN | 102482366 A | 5/2012 |
| EP | 0521908 B1 | 7/1996 |
| EP | 1 113 028 B1 | 3/2004 |
| EP | 1237963 B1 | 9/2004 |
| EP | 2 093 240 A1 | 8/2009 |
| EP | 2881406 A1 | 6/2015 |
| EP | 2883890 A1 | 6/2015 |
| EP | 2883891 A1 | 6/2015 |
| EP | 2902421 A1 | 8/2015 |
| EP | 3000832 A1 | 3/2016 |
| JP | 9-512848 A | 12/1997 |
| JP | 2005-517068 A | 6/2005 |
| JP | 2008-527050 A | 7/2008 |
| JP | 2011-500937 A | 1/2011 |
| JP | 2012-531503 A | 12/2012 |
| JP | 2013-510221 A | 3/2013 |
| KR | 1996-0014912 B1 | 10/1996 |
| KR | 10-2000-0052136 A | 8/2000 |
| KR | 10-2001-0020395 A | 3/2001 |
| KR | 10-2001-0032325 A | 4/2001 |
| KR | 10-2002-0064334 A | 8/2002 |
| KR | 10-2002-0091084 A | 12/2002 |
| KR | 10-0411923 B1 | 12/2003 |
| KR | 10-0488833 B1 | 5/2005 |
| KR | 10-0535582 B1 | 12/2005 |
| KR | 10-2006-0054293 A | 5/2006 |
| KR | 10-0820542 B1 | 4/2008 |
| KR | 10-2008-0099529 A | 11/2008 |
| KR | 10-2008-0101542 A | 11/2008 |
| KR | 10-2009-0027212 A | 3/2009 |
| KR | 10-2009-0116737 A | 11/2009 |
| KR | 10-2010-0081485 A | 7/2010 |
| KR | 10-2010-0090714 A | 8/2010 |
| KR | 10-0976131 B1 | 8/2010 |
| KR | 10-2011-0002153 A | 1/2011 |
| KR | 10-2011-0017072 A | 2/2011 |
| KR | 10-2012-0016596 A | 2/2012 |
| KR | 10-2012-0101683 A | 9/2012 |
| KR | 10-1237574 B1 | 2/2013 |
| KR | 10-1262305 B1 | 5/2013 |
| KR | 10-2013-0087736 A | 8/2013 |
| KR | 10-2013-0090844 A | 8/2013 |
| KR | 10-1367402 B1 | 2/2014 |
| WO | 2014/000230 A1 | 1/2014 |

OTHER PUBLICATIONS

Search Report issued by the European Patent Office in Appl'n No. 14816719.0, dated May 3, 2016.
Search Report issued by the European Patent Office in Appl'n No. 13888269.1, dated Jun. 9, 2016.
Search Report issued by the European Patent Office in Appl'n No. 14817033.5, dated Jun. 20, 2016.
Office Action issued by the Chinese Patent Office in Appl'n No. 201480002702.1, dated Apr. 21, 2016.
Office Action issued by the Chinese Patent Office in Appl'n No. 201480002698.9, dated Jun. 1, 2016.
Office Action issued by the Chinese Patent Office in Appl'n No. 201480002718.2, dated Jun. 8, 2016.
Office Action issued by the Korean Patent Office in Appl'n No. 10-2014-0047679, dated Jun. 13, 2016.
Office Action of issued by the Chinese Patent Office in Appl'n No. 201380053911.4, dated Dec. 28, 2015.
Office Action of issued by the Japanese Patent Office in Appl'n No. 2015-527402, dated Mar. 1, 2016.
International Search Report from PCT/KR2014/005811, dated Oct. 7, 2014.
Written Opinion of the ISA from PCT/KR2014/005811, dated Oct. 7, 2014.
"Contributed Lectures" Alexy, et al. Chem. Listy 103, s40-s50 (2009).
"Carbon-13 NMR of Ethylene-l-Olefin Copolymers:Extension to the Short-Chain Branch Distribution in a Low-Density Polyethylene"; Randall; Journal of Polymer Science: Polymeo Physics Edition Vol. 11, 275-287 (1973).
"Structural Determination of Ethylene-Propylene-DieneRubber (EPDM) Containing High Degree of Controlled Long-Chain Branching" Mitra, et al.; Journal of Applied Polymer Science,vol. 113, 2962-2972 (2009) WC 2009 Wiley Periodicals, Inc.
"13C NMR Determination of Monomer Sequence Distribution inEthylene-Propylene Copolymers Prepared with 6-TiC13-Al( C2H5%) Cl" Kakugo, et al.; Macromolecules 1982,15, 1150-1152.
Henri G. Burhin et al., An Innovative Method to Investigate Polymer Long Chain Branching with FT-Rheoogy and Large Amplitude Oscillatory Shear (LAOS), CHEM LISTY 103, 2009, pp. s48-s51.

* cited by examiner

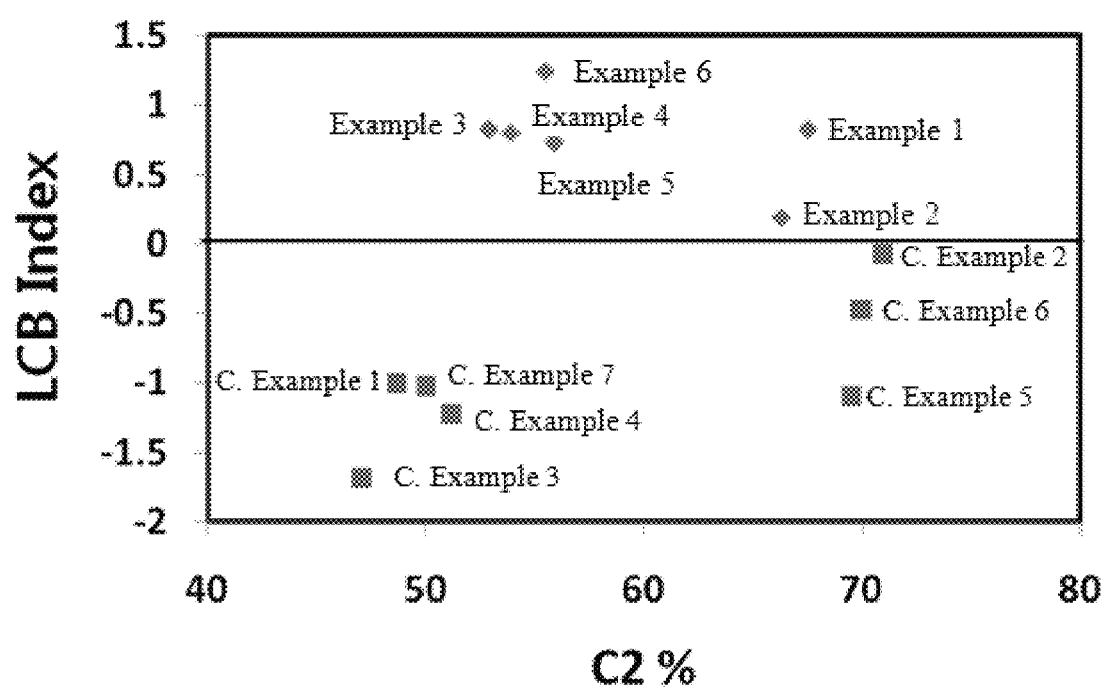

ELASTIC DIENE TERPOLYMER AND PREPARATION METHOD THEREOF

This application is a National Stage Application of International Application No. PCT/KR2014/005811, filed Jun. 30, 2014, and claims the benefit of Korean Patent Application No. 10-2013-0075873, filed on Jun. 28, 2013, Korean Patent Application No. 10-2014-0040551, filed on Apr. 4, 2014, Korean Patent Application No. 10-2014-0047679, filed on Apr. 21, 2014, and Korean Patent Application No. 10-2014-0080039, filed on Jun. 27, 2014, all of which are hereby incorporated by reference in their entirety for all purposes as if fully set forth herein.

TECHNICAL FIELD

The present invention relates to an elastic terpolymer which is a copolymer of ethylene, an alpha-olefin, and a diene, and a preparation method thereof. More particularly, the present invention relates to a long-chain branched elastic terpolymer capable of satisfying excellent mechanical properties and elasticity (flexibility) at the same time, and a preparation method thereof.

BACKGROUND OF ART

EPDM rubber, which is an elastic terpolymer of ethylene, an alpha-olefin such as propylene, etc., and a diene such as ethylidene norbornene, etc., has a molecular structure having no unsaturated bond in the main chain, and has superior weather resistance, chemical resistance, and heat resistance to the general conjugated diene rubbers. Owing to these properties, the elastic terpolymers such as EPDM rubber have been used in a wide variety of industrial applications such as automotive part materials, electric wire materials, construction and hoses, gaskets, belts, bumpers, blends with plastics, etc.

Conventionally, the elastic terpolymers such as EPDM rubber have been mainly prepared by copolymerization of three kinds of monomers using a catalyst containing a vanadium compound, for example, a vanadium-based Ziegler-Natta catalyst. However, a large amount of the vanadium-based catalyst is needed because of its low catalytic activity, thereby causing a problem of increasing the content of the metal remaining in the copolymer. Thus, processes for catalyst removal and decolorization are required after preparation of the copolymer, and the residual catalyst in the polymer may cause deterioration of heat resistance, generation of impurities, inhibition of vulcanization, etc. Practically, when the elastic terpolymer is prepared using the catalyst containing the vanadium compound, it is difficult to control the reaction temperature due to the low polymerization activity and low temperature polymerization conditions, and also to control the molecular structure of the copolymer due to difficulties in the control of feeding amounts of comonomers such as propylene and a diene. Accordingly, there has been a limitation in the preparation of the elastic terpolymer having various physical properties by using the vanadium-based catalyst. Due to these problems, a method for preparing the elastic terpolymers such as EPDM rubber using a Group IV metallocene-based transition metal catalyst instead of vanadium-based Ziegler-Natta catalyst has been recently developed.

Since the Group IV transition metal catalyst exhibits high polymerization activity in the olefin polymerization, it is possible to prepare copolymers having a higher molecular weight, and also to easily control the molecular weight distribution and composition of the copolymer. In addition, the catalyst has an advantage that a variety of comonomers can be copolymerized. For example, U.S. Pat. Nos. 5,229,478 and 6,545,088, and Korean Patent No. 0488833 disclose that elastic terpolymers having a high molecular weight can be obtained with excellent polymerization activity by using various metallocene-based Group IV transition metal catalysts obtained from ligands such as cyclopentadienyl, indenyl, fluorenyl, etc.

However, when three kinds of monomers are copolymerized using these conventional Group IV transition metal catalysts, there is a disadvantage that distributions of the repeating units derived from the monomers are not uniform in the copolymer chains due to high reactivity for comonomers of alpha-olefins. As a result, it is difficult to obtain elastic terpolymers such as EPDM rubber having excellent elasticity and flexibility.

Further, U.S. Pat. No. 5,902,867 discloses a method for decreasing viscosity of the polymer by broadening of the molecular weight distribution in order to improve kneading processability and extrusion processability of EPDM. In this case, however, there is a limitation that polymer separation occurs during processing due to low molecular weight components included in the crosslinked rubber product, leading to deterioration of surface properties and low-temperature properties.

Accordingly, there is a continuous demand for a long-chain branched elastic terpolymer capable of satisfying excellent processability and elasticity (flexibility) at the same time, and a preparation method capable of preparing the same with high productivity and yield.

PRIOR ART DOCUMENT

Patent Documents (Patent Document 0001) U.S. Pat. No. 5,229,478
(Patent Document 0002) U.S. Pat. No. 6,545,088
(Patent Document 0003) Korean Patent No. 0488833
(Patent Document 0004) U.S. Pat. No. 5,902,867

DETAILED DESCRIPTION OF THE INVENTION

Technical Problem

Accordingly, the present invention provides a long-chain branched elastic terpolymer capable of satisfying excellent processability and elasticity (flexibility) at the same time.

Further, the present invention provides a preparation method of an elastic terpolymer, which is able to prepare the long-chain branched elastic terpolymer with high productivity.

Technical Solution

The present invention provides an elastic terpolymer, in which the elastic terpolymer is a copolymer of ethylene, an alpha-olefin having 3 to 20 carbon atoms, and a diene, obtained in the presence of a Group IV transition metal catalyst, and i) its weight average molecular weight measured by GPC is 100,000 to 500,000, and ii) its LCB Index which is a ratio of $1^{st}$ harmonics of storage modulus to $5^{th}$ harmonics of storage modulus measured at 125° C. using a rubber process analyzer according to a LAOS (Large Angles of Oscillation and high Strains) method has a positive value.

Further, the present invention provides a method for preparing the elastic terpolymer, including the step of continuously feeding a monomer composition containing 40 to 70% by weight of ethylene, 20 to 50% by weight of an alpha-olefin having 3 to 20 carbon atoms, and 2 to 20% by weight of a diene to a reactor to perform copolymerization in the presence of a catalytic composition including a first transition metal compound represented by the following Chemical Formula 1 and a second transition metal compound represented by the following Chemical Formula 2:

[Chemical Formula 1]

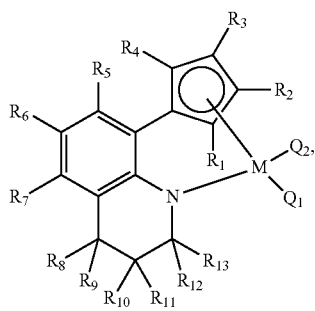

[Chemical Formula 2]

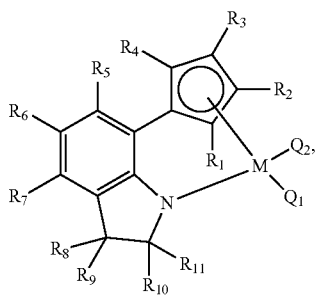

wherein $R_1$ to $R_{13}$ may be the same as or different from each other, and are each independently hydrogen, an alkyl radical having 1 to 20 carbon atoms, an alkenyl radical having 2 to 20 carbon atoms, an aryl radical having 6 to 20 carbon atoms, a silyl radical, an alkylaryl radical having 7 to 20 carbon atoms, an arylalkyl radical having 7 to 20 carbon atoms, or a hydrocarbyl-substituted metalloid radical of a Group IV metal; of $R_1$ to $R_{13}$, two different neighboring groups are connected to each other by an alkylidine radical containing an alkyl having 1 to 20 carbon atoms or an aryl radical having 6 to 20 carbon atoms to form an aliphatic or aromatic ring;

M is a Group IV transition metal; and $Q_1$ and $Q_2$ may be the same as or different from each other, and are each independently a halogen radical, an alkyl radical having 1 to 20 carbon atoms, an alkenyl radical having 2 to 20 carbon atoms, an aryl radical having 6 to 20 carbon atoms, an alkylaryl radical having 7 to 20 carbon atoms, an arylalkyl radical having 7 to 20 carbon atoms, an alkylamido radical having 1 to 20 carbon atoms, an arylamido radical having 6 to 20 carbon atoms, or an alkylidene radical having 1 to 20 carbon atoms.

Hereinafter, an elastic terpolymer and a preparation method thereof will be described in detail according to specific embodiments of the present invention.

First, as used herein, the term "elastic terpolymer" may be defined as follows, unless otherwise specified. The "elastic terpolymer" refers to any elastic copolymer (e.g., a cross-linkable random copolymer) obtained by copolymerization of three kinds of monomers of ethylene, an alpha-olefin having 3 to 20 carbon atoms, and a diene. A representative example of the "elastic terpolymer" is EPDM rubber which is a copolymer of ethylene, propylene, and a diene. However, it is apparent that this "elastic terpolymer" refers to not only the copolymer of the three monomers, but also to any elastic copolymer obtained by copolymerization of one or more monomers belonging to an alpha-olefin and one or more monomers belonging to a diene, together with ethylene. For example, an elastic copolymer obtained by copolymerization of ethylene, two kinds of alpha-olefins of propylene and 1-butene, and two kinds of dienes of ethylidene norbornene and 1,4-hexadiene may also be included in the scope of the "elastic terpolymer", because it is also obtained by copolymerization of three kinds of monomers belonging to ethylene, alpha-olefin, and diene, respectively.

Meanwhile, according to one embodiment of the present invention, the present invention provides an elastic terpolymer, in which the elastic terpolymer is a copolymer of ethylene, an alpha-olefin having 3 to 20 carbon atoms, and a diene, obtained in the presence of a Group IV transition metal catalyst, and i) its weight average molecular weight measured by GPC is 100,000 to 500,000, and ii) its LCB Index which is a ratio of $1^{st}$ harmonics of storage modulus to $5^{th}$ harmonics of storage modulus measured at 125° C. using a rubber process analyzer according to the LAOS (Large Angles of Oscillation and high Strains) method has a positive value.

The elastic terpolymer of one embodiment, resulting from copolymerization of three kinds of monomers of ethylene, an alpha-olefin, and a diene within a predetermined content range, has a relatively high weight average molecular weight of approximately 100,000 to 500,000, or approximately 150,000 to 400,000, or 200,000 to 300,000, as measured by GPC. Such high weight average molecular weight is achieved due to excellent activity of a Group IV transition metal catalyst, for example, metallocene-based first and second transition metal compounds of Chemical Formulae 1 and 2, described below. As the elastic terpolymer of one embodiment has such a high molecular weight, the elastic terpolymer, for example, EPDM rubber, exhibits excellent mechanical properties.

Further, the elastic terpolymer of one embodiment may have a positive LCB Index which is a ratio of $1^{st}$ harmonics of storage modulus to $5^{th}$ harmonics of storage modulus measured at 125° C. using a rubber process analyzer according to the LAOS (Large Angles of Oscillation and high Strains) method. Preferably, it may have a value of approximately more than 0 and 5 or less, or approximately 0.01 to 3.5.

The elastic terpolymer of one embodiment satisfying the condition has sufficiently long chain branching to have a positive LCB index, and thus it shows excellent processability and is suitable for extrusion, and also satisfies excellent mechanical properties as well as more improved elasticity and flexibility, at the same time.

Further, the elastic terpolymer of one embodiment may be obtained in the presence of a Group IV transition metal catalyst. In particular, the elastic terpolymer having the above properties can be prepared with, for example, the characteristic high productivity and yield of a Group IV metallocene-based transition metal catalyst, and it has a high molecular weight, thereby satisfying excellent mechanical properties, while satisfying excellent processability, elasticity, and flexibility at the same time by solving the problems of the conventional EPDM rubber prepared by the Group IV metallocene-based transition metal catalyst.

Further, the copolymer of ethylene, an alpha-olefin having 3 to 20 carbon atoms, and a diene may be a copolymer of 40 to 70% by weight of ethylene, 15 to 55% by weight of an alpha-olefin having 3 to 20 carbon atoms, and 0.5 to 20% by weight of a diene. This copolymer can be prepared by copolymerization while continuously feeding a monomer composition containing 40 to 70% by weight of ethylene, 20 to 50% by weight of an alpha-olefin having 3 to 20 carbon atoms, and 2 to 20% by weight of a diene to a reactor in the presence of a catalytic composition. In particular, as each of the monomers is included at the above ratio, excellent elasticity and flexibility can be achieved.

Meanwhile, the LCB Index of the elastic terpolymer of one embodiment may be measured using a rubber process analyzer according to the LAOS (Large Angles of Oscillation and high Strains) method as follows. First, after the elastic terpolymer is polymerized and prepared, shear storage modulus behavior of each copolymer was measured using a SIS V-50 rubber process analyzer of SCARABAEUS INSTRUMENTS SYSTEMS at a predetermined temperature (125° C.) and frequency (0.2 Hz) while varying strain from 0.2% to 1250%. The measured storage modulus was converted into FT to deduce $1^{st}$ harmonics and $5^{th}$ harmonics, and then a ratio of the $1^{st}$ harmonics of storage modulus to $5^{th}$ harmonics of storage modulus can be calculated as the LCB Index.

In this regard, when $1^{st}$ harmonics and $5^{th}$ harmonics of the measured storage modulus are defined as $G'_1$ and $G'_5$, respectively, the LCB Index can be expressed as the following Equation 1.

$$\text{LCB Index} = G'_1/G'_5 \quad [\text{Equation 1}]$$

The results of calculating the LCB Index of the elastic terpolymer of one embodiment by this method showed that the elastic terpolymer has higher long chain branching than the EPDM rubber prepared by the Group IV transition metal catalyst previously used so as to have positive LCB Index. The elastic terpolymer of one embodiment having high long chain branching and positive LCB Index was found to satisfy excellent elasticity, flexibility, and melt processability as well as excellent mechanical properties due to high molecular weight.

Further, in the elastic terpolymer of one embodiment, a difference in dynamic complex viscosity between angular frequencies of 1.0 rad/s and 100.0 rad/s may be approximately 30,000 Pa·s or more, and preferably approximately 30,000 to 50,000 Pa·s, as measured at 125° C. using a rubber process analyzer.

Since the elastic terpolymer of one embodiment shows a difference in dynamic complex viscosity of 30,000 Pa·s or more between angular frequencies of 1.0 rad/s and 100.0 rad/s, it has a high dynamic complex viscosity at a low angular frequency which is under practical use, so as to exhibit excellent mechanical properties, and it has a low dynamic complex viscosity at a high angular frequency which is under extrusion/injection processing so as to exhibit excellent elasticity, flexibility, and melt processability, and therefore, the elastic terpolymer is suitable for extrusion/injection processing.

More specifically, the elastic terpolymer may have a dynamic complex viscosity of 30,000 Pa·s or more, or 33,000 to 150,000 Pa·s at an angular frequency of 1.0 rad/s.

The angular frequency of 1.0 rad/s is similar to the state where the elastic terpolymer is actually used, and the copolymer has a high dynamic complex viscosity of 30,000 Pa·s or more at an angular frequency of 1.0 rad/s, thereby exhibiting excellent mechanical properties.

Further, the elastic terpolymer may have a high dynamic complex viscosity of 5000 Pa·s or less, or 4500 Pa·s or less at an angular frequency of 100.0 rad/s. The angular frequency of 100.0 rad/s is similar to the extrusion/injection processing state, and the copolymer has a low dynamic complex viscosity at an angular frequency of 100.0 rad/s, thereby exhibiting excellent elasticity, flexibility, and melt processability.

The difference in dynamic complex viscosity of the elastic terpolymer can be measured by using a rubber process analyzer as follows. First, after the elastic terpolymer is polymerized and prepared, dynamic complex viscosity of each copolymer was measured using an RPA2000 MV 2000E rubber process analyzer of Monsanto Co. at a predetermined temperature (125° C.) and a frequency range of 0.1-210 rad/s. Then, a difference between the dynamic complex viscosity at the angular frequency of 1.0 rad/s and the dynamic complex viscosity at the angular frequency of 100.0 rad/s thus measured can be obtained by an arithmetic calculation.

Further, the elastic terpolymer of one embodiment may have a density range to satisfy the physical properties suitable as EPDM rubber, for example, a density of approximately 0.840 to 0.895 g/cm$^3$, or approximately 0.850 to 0.890 g/cm$^3$.

Further, the elastic terpolymer of one embodiment may have a Mooney viscosity (1+4@125° C.) range to satisfy physical properties suitable as EPDM rubber, for example, a Mooney viscosity of approximately 1 MU to 180 MU, or approximately 5 MU to 150 MU, or approximately 20 MU to 130 MU. The Mooney viscosity (1+4@125° C.) can be measured in accordance with ASTM D1646-04 using a Monsanto alpha 2000 instrument. If the Mooney viscosity is less than 20 MU, there is no difference in processability according to long chain branching, and if the Mooney viscosity is more than 130 MU, the preparation by the present invention is possible, but polymer productivity is decreased due to high viscosity, which is not beneficial in economic aspects.

Further, in the elastic terpolymer of one embodiment, the alpha-olefin may be one or more alpha-olefins having 3 to 20 carbon atoms such as propylene, 1-butene, 1-hexene, 1-octene, 1-pentene, 4-methyl-1-pentene, 1-hexene, 1-heptene, 1-decene, 1-undecene, 1-dodecene, 1-tridecene, 1-tetradecene, 1-pentadecene, 1-hexadecene, 1-heptadecene, 1-nonadecene, 9-methyl-1-decene, 11-methyl-1dodecene, 12-ethyl-1-tetradecene, etc. Of them, alpha-olefins having 3 to 10 carbon atoms, such as representative examples of propylene, 1-butene, 1-hexene, or 1-octene, may be properly used.

Further, a non-conjugated diene-based monomer may be used as the diene. Specific examples thereof may include 5-1,4-hexadiene, 1,5-heptadiene, 1,6-octadiene, 1,7-nonadiene, 1,8-decadiene, 1,12-tetradecadiene, 3-methyl-1,4-hexadiene, 4-methyl-1,4-hexadiene, 5-methyl-1,4-hexadiene, 4-ethyl-1,4-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1, 6-octadiene, 6-ethyl-1,6-octadiene, 6-propyl-1,6-octadiene, 6-butyl-1,6-octadiene, 7-methyl-1,6-octadiene, 4-methyl-1,4-nonadiene, ethylidene-2-norbornene, 5-methylene-2-norbornene, 5-(2-propenyl)-2-norbornene, 5-(3-buteny)-2-norbornene, 5-(1-methyl-2-propenyl)-2-norbornene, 5-(4-pentenyl)-2-norbornene, 5-(1-methyl-3-buteny)-2-norbornene, 5-(5-hexenyl)-2-norbornene, 5-(1-methyl-4-pentenyl)-2-norbornene, 5-(2,3-dimethyl-3-buteny)-2-norbornene, 5-(2-ethyl-3-buteny)-2-norbornene, 5-(6-heptenyl)-2-norbornene, 5-(3-methyl-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, 5-(1,2,3-trimethyl-4-pentenyl)-2-norbornene, 5-propylidene-2-norbornene, 5-isopropylidene-2-norbornene, 5-butylidene-2-norbornene, 5-isobutylidene-2-norbornene, 2,3-diisopropylidene-5-norbornene, 2-ethylidene-3-isopropylidene-5-norbornene, and 2-propenyl-2,2-norbornadiene, and one or more dienes selected therefrom may be used.

Of the dienes, in particular, 5-ethylidene-2-norbornene, 5-methylene-2-norbornene, or 4-hexadiene may be properly used to prepare the elastic terpolymer, which satisfies the weight average molecular weight and LCB Index of one embodiment. Meanwhile, 5-vinyl-2-norbornene (VNB) or dicyclopentadiene (DCPD) which has been used as the diene in the conventional preparation of the elastic terpolymer has two double bonds, which participate in polymerization reaction to show a crosslinked polymer structure. Therefore, there are limitations that gel particles are formed during polymerization, or it is difficult to control the molecular weight of the copolymer and also difficult to control the polymerization reaction.

Meanwhile, according to another embodiment of the present invention, provided is a method for preparing the above-described elastic terpolymer of one embodiment. The preparation method of the copolymer may include the step of continuously feeding a monomer composition containing 40 to 70% by weight of ethylene, 20 to 50% by weight of an alpha-olefin having 3 to 20 carbon atoms, and 2 to 20% by weight of a diene to a reactor to perform copolymerization in the presence of a catalytic composition including a first transition metal compound represented by the following Chemical Formula 1 and a second transition metal compound represented by the following Chemical Formula 2:

[Chemical Formula 1]

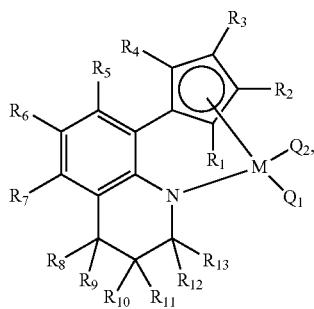

[Chemical Formula 2]

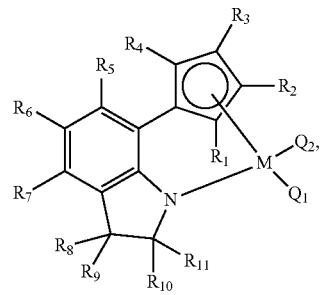

wherein $R_1$ to $R_{13}$ may be the same as or different from each other, and are each independently hydrogen, an alkyl radical having 1 to 20 carbon atoms, an alkenyl radical having 2 to 20 carbon atoms, an aryl radical having 6 to 20 carbon atoms, a silyl radical, an alkylaryl radical having 7 to 20 carbon atoms, an arylalkyl radical having 7 to 20 carbon atoms, or a hydrocarbyl-substituted metalloid radical of a Group IV metal; of $R_1$ to $R_{13}$, two different neighboring groups are connected to each other by an alkylidine radical containing an alkyl having 1 to 20 carbon atoms or an aryl radical having 6 to 20 carbon atoms to form an aliphatic or aromatic ring;

M is a Group IV transition metal; and $Q_1$ and $Q_2$ may be the same as or different from each other, and are each independently a halogen radical, an alkyl radical having 1 to 20 carbon atoms, an alkenyl radical having 2 to 20 carbon atoms, an aryl radical having 6 to 20 carbon atoms, an alkylaryl radical having 7 to 20 carbon atoms, an arylalkyl radical having 7 to 20 carbon atoms, an alkylamido radical having 1 to 20 carbon atoms, an arylamido radical having 6 to 20 carbon atoms, or an alkylidene radical having 1 to 20 carbon atoms.

As confirmed in the following examples, etc., while predetermined amounts of monomers, that is, approximately 40 to 70% by weight or approximately 50 to 70% by weight of ethylene, approximately 15 to 55% by weight, or approximately 25 to 45% by weight of an alpha-olefin having 3 to 20 carbon atoms, and approximately 0.5 to 20% by weight, or approximately 2 to 10% by weight of a diene are used, each of the monomers is prepared by a continuous polymerization process in the presence of the transition metal catalyst of Chemical Formula 1 or 2 to obtain the elastic terpolymer of one embodiment having the above-described high molecular weight range and positive LCB Index in a high yield and productivity.

This is mainly attributed to excellent catalytic activities of the two kinds of particular catalysts and reactivities of the comonomers. The particular catalysts of the first and second transition metal compounds exhibit excellent catalytic activities as Group IV transition metal catalysts, and in particular, they exhibit excellent selectivity and copolymerization reactivity for comonomers such as alpha-olefins and dienes. Moreover, by using these two kinds of particular catalysts, copolymerization is allowed to occur while a relatively high content of diene is uniformly distributed in the polymer chains. It seems that this is because the particular catalysts of Chemical Formulae 1 and 2 very stably maintain rigid five- and six-membered ring structures around metals by a quinoline-based amido group, and therefore they have a structural characteristic accessible by the monomers. That is, based on the above-described structural characteristics of the catalysts, the particular catalysts of Chemical Formulae 1 and 2 are able to form a long-chain branched macromer having double bonds during copolymerization of ethylene and alpha-olefin, in turn, which is copolymerized by reaction with the catalysts to form a long-chain branched elastic terpolymer.

Moreover, using the two kinds of the particular catalysts of the first and second transition metal compounds, copolymerization is performed in a continuous manner while continuously feeding a monomer composition containing the monomers to a polymerization reactor, resulting in more uniform distribution of the comonomer, in particular, the diene, in the polymer chains.

As a result, a long-chain branched elastic terpolymer having a high molecular weight, in which the monomers are alternately distributed, can be prepared with high productivity and yield, thereby satisfying the above-described properties of one embodiment, for example, properties of having a weight average molecular weight of 100,000 to 500,000 and a positive LCB Index.

Therefore, according to the preparation method of another embodiment, the above-described elastic terpolymer of one embodiment can be prepared with high productivity and yield, and this elastic terpolymer satisfies excellent mechanical properties and more improved elasticity at the same time to be very preferably used as the EPDM rubber prepared by Group IV transition metal catalysts.

However, if the above-described two kinds of particular catalysts are not used, or if only one of them is used, or if the content of each monomer, in particular, the content of the diene is out of the above-described proper range, the final elastic terpolymer may not satisfy the high molecular weight range or the LCB Index range of one embodiment.

Meanwhile, for the above-described preparation method of the elastic terpolymer of another embodiment, a more detailed description of the first and second transition metal compounds represented by Chemical Formulae 1 and 2 will be given below.

First, in Chemical Formulae 1 and 2, hydrocarbyl refers to the monovalent moiety obtained upon removal of a hydrogen atom from a hydrocarbon, and for example, it encompasses an alkyl group such as ethyl, etc., or an aryl group such as phenyl, etc.

Further, in Chemical Formulae 1 and 2, metalloid means a semi-metal having properties of both a metal and a non-metal, and refers to arsenic, boron, silicon, tellurium, or the like. M refers to, for example, a Group IV transition metal element such as titanium, zirconium, hafnium, or the like.

Of these first and second transition metal compounds, the first transition metal compound of Chemical Formula 1 may be properly one or more selected from the group consisting of the following compounds:

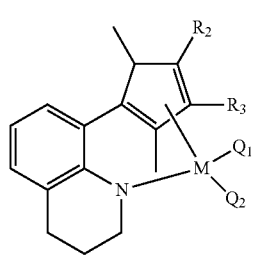
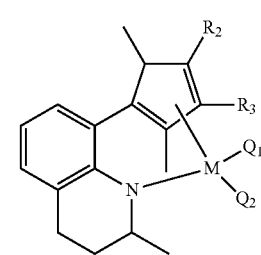
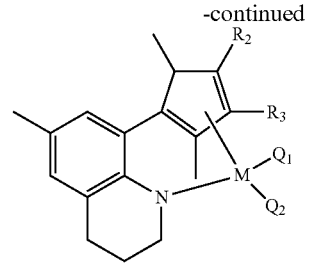

-continued

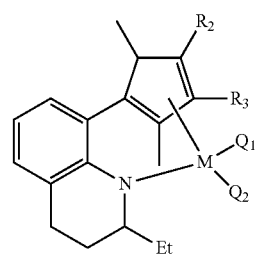

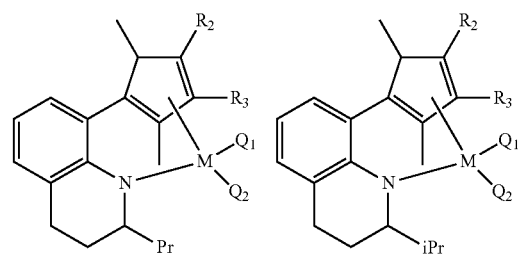

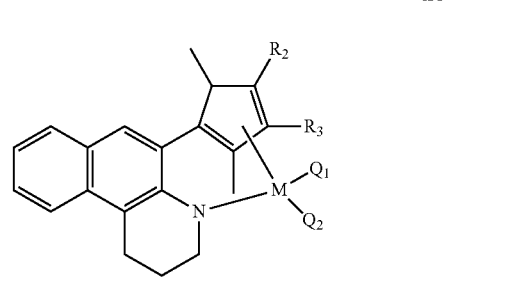

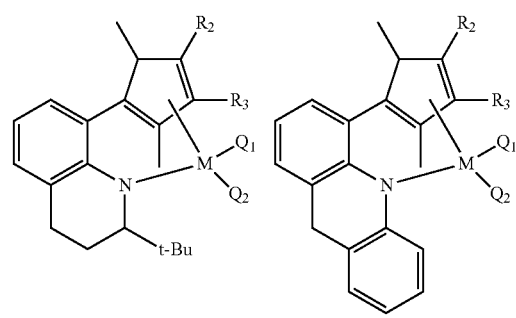

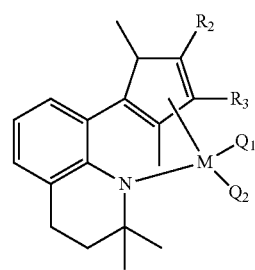

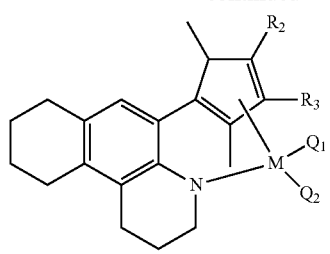

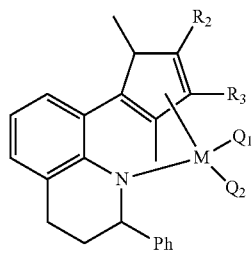

wherein $R_2$ and $R_3$ are the same as or different from each other and are each independently hydrogen or a methyl radical, M is a Group IV transition metal, and $Q_1$ and $Q_2$ are the same as or different from each other and are each independently a methyl radical, a dimethylimido radical, or a chlorine radical.

Further, the second transition metal compound of Chemical Formula 2 may be properly one or more selected from the group consisting of the following compounds:

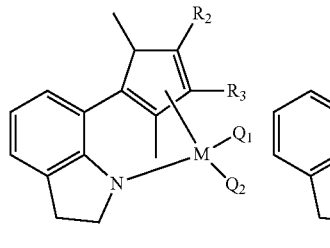
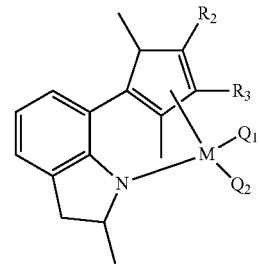

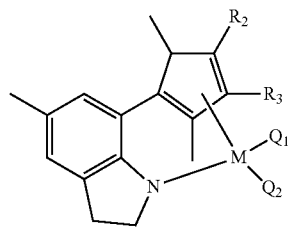

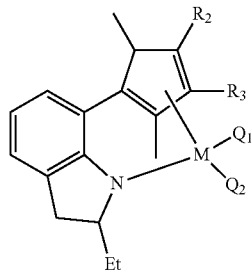

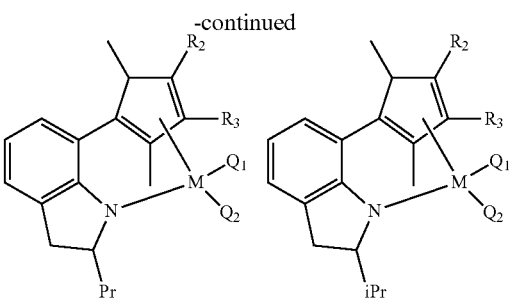

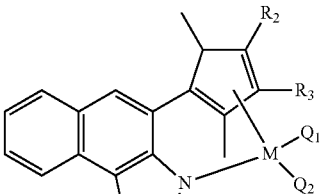

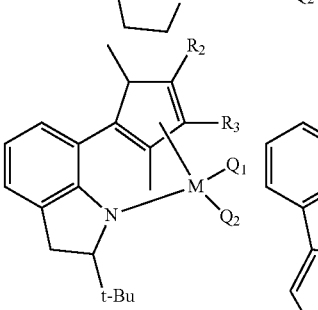

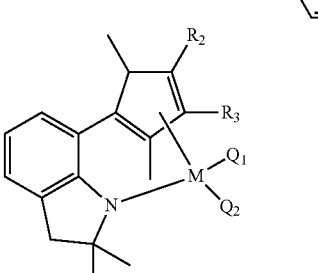

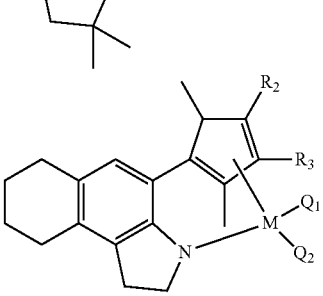

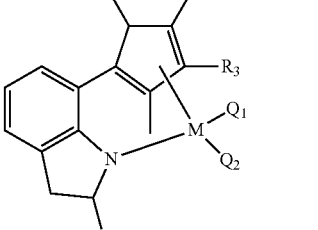

wherein $R_2$ and $R_3$ are the same as or different from each other and are each independently hydrogen or a methyl radical, M is a Group IV transition metal, and $Q_1$ and $Q_2$ are the same as or different from each other and are each independently a methyl radical, a dimethylimido radical, or a chlorine radical.

Meanwhile, the catalytic composition used in the preparation method of another embodiment may further include one or more co-catalytic compounds selected from the group consisting of the following Chemical Formula 3, Chemical Formula 4 and Chemical Formula 5, in addition to the above described first and second transition metal compounds:

—[Al(R)—O]$_n$—                            [Chemical Formula 3]

wherein R's are the same as or different from each other and are each independently halogen, a hydrocarbon having 1 to 20 carbon atoms, or a halogen-substituted hydrocarbon having 1 to 20 carbon atoms, and n is an integer of 2 or more;

D(R)$_3$                                      [Chemical Formula 4]

wherein R is the same as defined in Chemical Formula 3, and D is aluminum or boron; and

[L-H]$^+$[ZA$_4$]$^-$ or [L]$^+$[ZA$_4$]$^-$             [Chemical Formula 5]

wherein L is a neutral or cationic Lewis acid, H is a hydrogen atom, Z is an element of Group 13, and A's are the same as or different from each other and are each independently an aryl group having 6 to 20 carbon atoms or an alkyl group having 1 to 20 carbon atoms, in which one or more hydrogen atoms are unsubstituted or substituted with a halogen, a hydrocarbon having 1 to 20 carbon atoms, an alkoxy, or phenoxy.

In the co-catalytic compound, examples of the compound represented by Chemical Formula 3 may include methylaluminoxane, ethylaluminoxane, isobutylaluminoxane, butylaluminoxane, or the like.

Further, examples of the compound represented by Chemical Formula 4 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminummethoxide, trimethylboron, triethylboron, triisobutylboron, tripropylboron, tributylboron or the like, and of them, trimethylaluminum, triethylaluminum, or triisobutylaluminum may be properly used.

The compound represented by Chemical Formula 5 may include a non-coordinating anion compatible with a cation as the Bronsted acid. Preferred anions are those containing a single coordination complex having a large size and a semi-metal. In particular, compounds containing a single boron atom in the anion portion are widely used. In this regard, salts containing anions including a coordination complex containing a single boron atom are preferably used as the compound represented by Chemical Formula 5.

As specific examples thereof, examples of trialkylammonium salts may include trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(2-butyl)ammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-triisopropylsilyl)-2,3,5,6-tetrafluorophenyl)borate, N,N-dimethylanilinium pentafluorophenoxytris(pentafluorophenyl)borate, N,N-diethylanilinium tetrakis(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl) ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, N,N-dimethyl-2,4,6-trimethylanilinium tetrakis(2,3,4,6-tetrafluorophenyl)borate, decyldimethylammonium tetrakis(pentafluorophenyl)borate, dodecyldimethylammonium tetrakis(pentafluorophenyl)borate, tetradecyldimethylammonium tetrakis(pentafluorophenyl)borate, hexadecyldimethylammonium tetrakis(pentafluorophenyl)borate, octadecyldimethylammonium tetrakis(pentafluorophenyl)borate, eicosyldimethylammonium tetrakis(pentafluorophenyl)borate, methyldidecylammonium tetrakis(pentafluorophenyl)borate, methyldidodecylammonium tetrakis(pentafluorophenyl)borate, methylditetradecylammonium tetrakis(pentafluorophenyl)borate, methyldihexadecylammonium tetrakis(pentafluorophenyl)borate, methyldioctadecylammonium tetrakis(pentafluorophenyl)borate, methyldieicosylammonium tetrakis(pentafluorophenyl)borate, tridecylammonium tetrakis(pentafluorophenyl)borate, tridodecylammonium tetrakis(pentafluorophenyl)borate, tritetradecylammonium tetrakis(pentafluorophenyl)borate, trihexadecylammonium tetrakis(pentafluorophenyl)borate, trioctadecylammonium tetrakis(pentafluorophenyl)borate, trieicosylammonium tetrakis(pentafluorophenyl)borate, decyldi(n-butyl) ammonium tetrakis(pentafluorophenyl)borate, dodecyldi(n-butyl)ammonium tetrakis(pentafluorophenyl)borate, octadecyldi(n-butyl) ammonium tetrakis(pentafluorophenyl)borate, N,N-didodecylanilinium tetrakis(pentafluorophenyl)borate, N-methyl-N-dodecylanilinium tetrakis(pentafluorophenyl)borate, methyldi(dodecyl)ammonium tetrakis(pentafluorophenyl)borate, or the like.

Further, examples of dialkylammonium salts may include di-(i-propyl) ammonium tetrakis(pentafluorophenyl)borate, dicyclohexylammonium tetrakis(pentafluorophenyl)borate, or the like.

Further, examples of carbonium salts may include tropylium tetrakis(pentafluorophenyl)borate, triphenylmethylium tetrakis(pentafluorophenyl)borate, benzene(diazonium) tetrakis(pentafluorophenyl)borate, or the like.

Meanwhile, in the above-described preparation method of the elastic terpolymer, the catalytic composition containing the above-described first and second transition metal compounds, and optionally the co-catalytic compound may be prepared by, for example, a method including the steps of contacting the first and second transition metal compounds with the co-catalytic compound of Chemical Formula 3 or Chemical Formula 4 to prepare a mixture; and adding the co-catalytic compound of Chemical Formula 5 to the mixture.

Further, in the catalytic composition, a molar ratio of the first transition metal compound to the second transition metal compound may be approximately 10:1 to 1:10, a molar ratio of the total transition metal compound of the first and second transition metal compounds to the co-catalytic compound of Chemical Formula 3 or Chemical Formula 4 may be approximately 1:5 to 1:500, and a molar ratio of the total transition metal compound to the co-catalytic compound of Chemical Formula 5 may be approximately 1:1 to 1:10.

Further, in the preparation method of the elastic terpolymer, the catalytic composition may additionally include a reaction solvent, and examples of the reaction solvent may include hydrocarbon-based solvents such as pentane, hexane, or heptane, etc., or aromatic solvents such as benzene, toluene, etc., but are not limited thereto.

As described above, alpha-olefin contained in the monomer composition may include propylene, 1-butene, 1-hexene, 1-octene, 1-pentene, 4-methyl-1-pentene, 1-hexene, 1-heptene, 1-decene, 1-undecene, 1-dodecene, or the like, and as the diene, a non-conjugated diene-based monomer may be used. Of them, as the monomers typically used in the preparation of EPDM rubber, for example, propylene as the alpha-olefin and a non-conjugated diene-based monomer such as 5-ethylidene-2-norbornene, 1,4-hexadiene, or dicyclopentadiene as the diene, may be properly used.

Further, in the above-described preparation method of the copolymer of another embodiment, the copolymerization step may be performed at a temperature of approximately 100 to 170° C., or at a temperature of approximately 100 to 160° C. If the copolymerization temperature is too low, it is difficult to prepare an elastic terpolymer in which the three kinds of monomers are alternately distributed uniformly. If the polymerization temperature is too high, thermal decomposition of the monomers or the prepared copolymer may occur. Further, copolymerization may be performed by solution polymerization, in particular, by a continuous solution polymerization method. In this regard, the above-described catalytic composition may be dissolved in the solution, and thus used in the form of homogeneous catalyst.

For the continuous solution polymerization, the copolymerization step may be performed by feeding the above-described monomer composition, the catalytic composition containing the first and second transition metal compounds, and optionally the cocatalyst in the solution state to a reactor, and the copolymerization step may be continuously performed by continuously discharging the copolymerized elastic terpolymer from the reactor.

By this continuous solution polymerization, a long-chain branched elastic terpolymer can be more effectively obtained with high productivity and yield.

Advantageous Effects

According to the present invention, as described above, a long-chain branched elastic terpolymer which has excellent processability and more improved elasticity and flexibility to be very preferably used as EPDM rubber can be prepared by a Group IV transition metal catalyst.

Further, according to the present invention, a method for preparing a copolymer capable of preparing the long-chain branched elastic terpolymer with high productivity and yield is provided.

Since the long-chain branched elastic terpolymer obtained according to the present invention overcomes the limitations of the previously known EPDM rubber which is prepared by a Group IV metallocene-based transition metal catalyst, and satisfies excellent elasticity and flexibility as well as other physical properties, it can be very preferably used as EPDM rubber while bringing out the characteristic advantage of the Group IV transition metal catalyst.

BRIEF DESCRIPTION OF DRAWINGS

FIG. 1 is a graph showing an LCB Index of elastic terpolymers prepared in Examples and Comparative Examples.

DETAILED DESCRIPTION OF THE EMBODIMENTS

The present invention will be described in more detail in the following examples. However, these examples are for illustrative purposes only and are not intended to limit the scope of the present invention.

<Synthesis of Ligand and Transition Metal Compound>

Synthesis of all ligands and catalysts was performed by standard Schlenk and glovebox techniques under a nitrogen atmosphere to avoid contact with air and moisture, and organic solvents used in reactions were purified by a standard method before use. The structures of the synthesized ligands and catalysts were confirmed by 400 MHz Nuclear Magnetic Resonance (NMR) Spectroscopy and X-ray Spectroscopy.

In the following examples, as first and second transition metal compounds, [(1,2,3,4-tetrahydroquinolin-8-yl)tetramethylcyclopentadienyl-eta5,kapa-N]titanium dimethyl and [(2-methylindolin-7-yl)tetramethylcyclopentadienyl-eta5, kapa-N]titanium dimethyl were used, respectively. As a co-catalytic compound, N,N-dimethylanilinium tetrakis (pentafluorophenyl)borate and triisobutylaluminum were used. The first and second transition metal compounds were prepared and used in the same manner as in Examples 2 and 14 of Korean Patent No. 0,976,131, and the co-catalytic compound was prepared and used in the same manner as in Example 9 of Korean Patent No. 0,820,542.

Examples 1 to 6

Preparation of Elastic Terpolymer of ethylene, propylene, and 5-ethylidene-2-norbornene Terpolymerization of ethylene, propylene, and 5-ethylidene-2-norbornene was continuously performed using a 2 L-pressure reactor. Hexane as a polymerization solvent was continuously fed to the bottom of the reactor at a feed rate of 6.7 kg per hour, and the polymerization solution was continuously discharged from the top of the reactor.

As the first and second transition metal compounds, the above-described [(1,2,3,4-tetrahydroquinolin-8-yl)tetramethylcyclopentadienyl-eta5,kapa-N]titanium dimethyl and [(2-methylindolin-7-yl)tetramethylcyclopentadienyl-eta5, kapa-N]titanium dimethyl dissolved in hexane were used, and fed to the reactor at a rate of 24 to 60 μmol per hour. Further, as the co-catalytic compound, the above-described N,N-dimethylanilinium tetrakis(pentafluorophenyl)borate dissolved in toluene was used, and fed to the reactor at a rate of 105 to 270 μmol per hour. Further, as the additional co-catalytic compound, the above-described triisobutylaluminum dissolved in hexane was used, and fed to the reactor at a rate of 1800 to 3200 μmol per hour.

As the monomers, ethylene at a rate of 890 to 900 g per hour, propylene at a rate of 450 to 550 g per hour, and 5-ethylidene-2-norbornene at a rate of 80 to 250 g per hour were continuously fed to the reactor to perform the copolymerization.

The copolymerization temperature in the reactor was controlled between 130 to 160° C. while 0.5 mL/min of the feed rate of 5-ethylidene-2-norbornene was increased from 1 mL/min at around 160° C.

Under the above-described conditions, copolymerization was performed by continuous solution polymerization to prepare elastic terpolymers of Examples 1 to 6 in the form of a homogeneous solution in a continuous manner, and the polymerization solutions continuously discharged from the top of the reactor were dried under reduced pressure in a 60° C. vacuum oven after termination of the polymerization reaction under ethanol, and finally, copolymers of Examples 1 to 6 were prepared.

Comparative Examples 1 to 7

Commercialized Elastic Terpolymer of ethylene, propylene, and 5-ethylidene-2-norbornene V-2502 of Exxon, which is a commercialized EPDM rubber known to be prepared by a metallocene catalyst, was used as an elastic terpolymer of Comparative Example 1, and 3722, 4520, 4640, 4725, 4770, and 4570 of DOW, which are also commercialized EPDM rubber known to be prepared by the metallocene catalyst, were used as elastic terpolymers of Comparative Examples 2-7, respectively.

Comparative Example 8

Commercialized Elastic Terpolymer of ethylene, propylene, and 5-ethylidene-2-norbornene KEP-2320 of Kumho Polychem, which is a commercialized EPDM rubber known to be prepared by a Ziegler-Natta catalyst, was used as an elastic terpolymer of Comparative Example 8.

Experimental Example 1

Measurement of LCB Index

Behaviors of shear storage modulus of the copolymers obtained in the examples and comparative examples were measured using a SIS V-50 rubber process analyzer of SCARABAEUS INSTRUMENTS SYSTEMS at a predetermined temperature (125° C.) and frequency (0.2 Hz) while varying strain from 0.2% to 1250%. The measured storage modulus was converted into FT to derive $1^{st}$ harmonics and $5^{th}$ harmonics, and then a ratio of the $1^{st}$ harmonics of storage modulus to $5^{th}$ harmonics of storage modulus was calculated as the LCB Index, and are shown in the following Table 1 and FIG. 1.

In this regard, when $1^{st}$ harmonics and $5^{th}$ harmonics of the measured storage modulus are defined as $G'_1$ and $G'_5$, respectively, the LCB Index can be expressed as the following Equation 1.

LCB Index=$G'_1/G'_5$     [Equation 1]

Experimental Example 2

Measurement of Dynamic Complex Viscosity

Dynamic complex viscosity was measured according to ASTM D6204-01 using a rubber process analyzer. RPA2000 MV 2000E instrument model of Monsanto Co. was used, and as a measurement sample, the antioxidant (Irganox 1076)-treated copolymer sample was prepared in a sheet form using a press mold, and dynamic complex viscosity thereof was measured at 125° C. and 7% strain and at a frequency range of 0.1-210 rad/s. In each copolymer of the examples and comparative examples, the dynamic complex viscosity with respect to change in the angular frequency is shown in the following Tables 2 and 3.

Experimental Example 3

Measurement of Mooney Viscosity

Mooney viscosity of the copolymers obtained in the examples and comparative examples was measured at 125° C. in accordance with ASTM D1646-04 using a Monsanto alpha 2000 instrument, and are shown in the following Table 1.

Experimental Example 4

Measurement of Weight Average Molecular Weight

Weight average molecular weight of the copolymers obtained in the examples and comparative examples was measured using PL-GPC 220 of Polymer Laboratory, which was equipped with 3 linear mixed bed columns, and are shown in the following Table 2. At this time, the measurement was performed at a temperature of 160° C. using 1,2,4-trichlorobenzene as a solvent at a flow rate of 1.0 ml/min.

TABLE 1

| | Ethylene wt % | Propylene wt % | 5-Ethylidene-2-norbornene wt % | Mooney viscosity 1 + 4 @ 125° C. | LCB Index |
|---|---|---|---|---|---|
| Example 1 | 67.5 | 23.0 | 9.5 | 87 | 0.82 |
| Example 2 | 66.3 | 21.9 | 11.8 | 81.4 | 0.19 |
| Example 3 | 52.9 | 42.3 | 4.8 | 28.1 | 0.82 |
| Example 4 | 53.9 | 41.3 | 4.8 | 28.4 | 0.8 |
| Example 5 | 55.9 | 39.1 | 5 | 22.7 | 0.73 |
| Example 6 | 55.5 | 39.5 | 5 | 41 | 1.24 |
| Comparative Example 1 | 48.7 | 47 | 4.3 | 25.5 | −1.01 |
| Comparative Example 2 | 71 | 28.5 | 0.5 | 18 | −0.08 |
| Comparative Example 3 | 47.1 | 47.3 | 5.6 | 21 | −1.69 |
| Comparative Example 4 | 51.2 | 43.6 | 5.2 | 39.4 | −1.23 |
| Comparative Example 5 | 69.5 | 25.4 | 5.1 | 25.8 | −1.1 |
| Comparative Example 6 | 70 | 25.1 | 4.9 | 70 | −0.47 |
| Comparative Example 7 | 50 | 45.1 | 4.9 | 70 | −1.03 |
| Comparative Example 8 | 54 | 41.2 | 4.8 | 28 | −0.53 |

TABLE 2

| Angular frequency | Dynamic complex viscosity (Pa · s) | | | | | |
|---|---|---|---|---|---|---|
| | Example 1 | Example 2 | Example 3 | Example 4 | Example 5 | Example 6 |
| 1.0 rad/s | 141,924 | 58,587 | 40,730 | 36,331 | 39,979 | 33,089 |
| 100.0 rad/s | 4,301 | 3,437 | 2,071 | 2,559 | 1,507 | 1,498 |
| *$\eta_{1.0\text{-}100.0}$ | 137,623 | 55,150 | 38,658 | 33,772 | 38,472 | 31,591 |
| Weight average molecular weight | 290,000 | 260,000 | 130,000 | 129,000 | 120,000 | 170,000 |

*a difference value between a value of dynamic complex viscosity at angular frequency of 1.0 rad/s and a value of dynamic complex viscosity at angular frequency of 100.0 rad/s

TABLE 3

| | Dynamic complex viscosity (Pa · s) | | | |
|---|---|---|---|---|
| Angular frequency | Comparative Example 2 | Comparative Example 3 | Comparative Example 5 | Comparative Example 8 |
| 1.0 rad/s | 23,335 | 22,130 | 30,187 | 28,146 |
| 100.0 rad/s | 1588 | 1697 | 1924 | 2506 |
| *η$_{1.0-100.0}$ | 21,747 | 20,433 | 28,263 | 25,640 |
| Weight average molecular weight | 120,000 | 120,000 | 133,000 | 194,000 |

*a difference value between a value of dynamic complex viscosity at angular frequency of 1.0 rad/s and a value of dynamic complex viscosity at angular frequency of 100.0 rad/s Referring to Table 1 and FIG. 1, it was found that the copolymers of Examples 1 to 6 showed positive LCB Index values, but the copolymers of Comparative Examples 1 to 7 showed negative LCB Index values.

Referring to Tables 2 and 3, it was found that the copolymers of Examples 1 to 6 showed the dynamic complex viscosity difference between angular frequencies of 1.0 rad/s and 100.0 rad/s of 30,000 Pa·s or more, indicating a great difference in the dynamic complex viscosity between the elastic terpolymers in practical use and those under an extrusion/injection processing state.

These results suggest that the elastic terpolymers of Examples 1 to 6 have higher long chain branching to exhibit excellent mechanical properties and melt processability, thereby having superior elasticity, flexibility, and processability to those of the comparative examples.

The invention claimed is:

1. An elastic terpolymer, wherein the elastic terpolymer is a copolymer of ethylene, an alpha-olefin having 3 to 20 carbon atoms, and a diene, obtained in the presence of a Group IV transition metal catalyst, wherein
   i) its weight average molecular weight measured by GPC is 100,000 to 500,000, and
   ii) its LCB Index, which is a ratio of 1$^{st}$ harmonics of storage modulus to 5$^{th}$ harmonics of storage modulus measured at 125° C. using a rubber process analyzer according to a LAOS (Large Angles of Oscillation and high Strains) method, has a positive value.

2. The elastic terpolymer of claim 1, wherein the LCB Index is more than 0 and 5 or less.

3. The elastic terpolymer of claim 1, wherein a difference in dynamic complex viscosity between angular frequencies of 1.0 rad/s and 100.0 rad/s is 30,000 Pa·s or more, as measured at 125° C. using a rubber process analyzer.

4. The elastic terpolymer of claim 1, wherein a dynamic complex viscosity at the angular frequency of 1.0 rad/s is 30,000 Pa·s or more.

5. The elastic terpolymer of claim 1, wherein a dynamic complex viscosity at the angular frequency of 100.0 rad/s is 5000 Pa·s or less.

6. The elastic terpolymer of claim 1, wherein the copolymer of ethylene, the alpha-olefin having 3 to 20 carbon atoms, and the diene is a copolymer of 40 to 70% by weight of ethylene, 15 to 55% by weight of the alpha-olefin having 3 to 20 carbon atoms and 0.5 to 20% by weight of the diene.

7. The elastic terpolymer of claim 1, wherein the elastic terpolymer has a density of 0.840 to 0.895 g/cm$^3$.

8. The elastic terpolymer of claim 1, wherein the elastic terpolymer has Mooney viscosity (1+4@125° C.) of 5 to 180.

9. The elastic terpolymer of claim 1, wherein the elastic terpolymer has a molecular weight distribution of 2 to 4.

10. The elastic terpolymer of claim 1, wherein the alpha-olefin is one or more selected from the group consisting of propylene, 1-butene, 1-hexene, and 1-octene, and the diene is one or more selected from the group consisting of 5-ethylidene-2-norbornene, 5-methylene-2-norbornene, and 4-hexadiene.

11. A method for preparing the elastic terpolymer of claim 1, comprising the step of continuously feeding a monomer composition containing 40 to 70% by weight of ethylene, 20 to 50% by weight of the alpha-olefin having 3 to 20 carbon atoms, and 2 to 20% by weight of the diene to a reactor to perform copolymerization in the presence of a catalytic composition including a first transition metal compound represented by the following Chemical Formula 1 and a second transition metal compound represented by the following Chemical Formula 2:

[Chemical Formula 1]

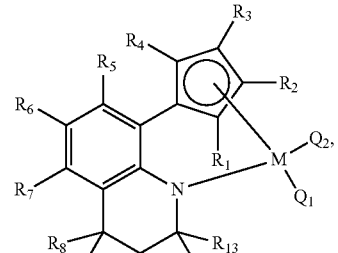

[Chemical Formula 2]

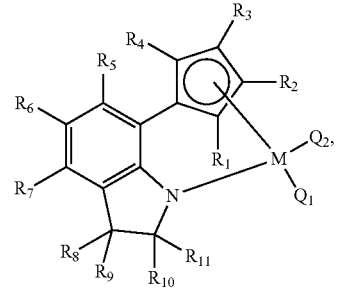

wherein $R_1$ to $R_{13}$ are the same as or different from each other, and are each independently hydrogen, an alkyl radical having 1 to 20 carbon atoms, an alkenyl radical having 2 to 20 carbon atoms, an aryl radical having 6 to 20 carbon atoms, a silyl radical, an alkylaryl radical having 7 to 20 carbon atoms, an arylalkyl radical having 7 to 20 carbon atoms, or a hydrocarbyl-substituted metalloid radical of a Group IV metal; of $R_1$ to $R_{13}$, two different neighboring groups are connected to each other by an alkylidine radical containing an alkyl having 1 to 20 carbon atoms or an aryl radical having 6 to 20 carbon atoms to form an aliphatic or aromatic ring;

M is a Group IV transition metal; and $Q_1$ and $Q_2$ are the same as or different from each other, and are each independently a halogen radical, an alkyl radical having 1 to 20 carbon atoms, an alkenyl radical having 2 to 20 carbon atoms, an aryl radical having 6 to 20 carbon atoms, an alkylaryl radical having 7 to 20 carbon atoms, an arylalkyl radical having 7 to 20 carbon atoms, an alkylamido radical having 1 to 20 carbon atoms, an arylamido radical having 6 to 20 carbon atoms, or an alkylidene radical having 1 to 20 carbon atoms.

12. The method of claim 11, wherein the first transition metal compound is one or more selected from the group consisting of the following compounds:

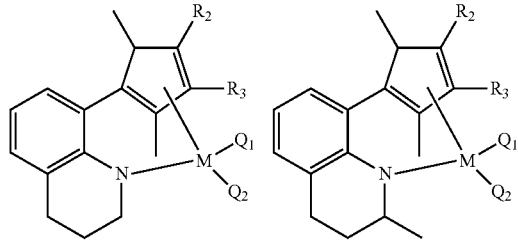
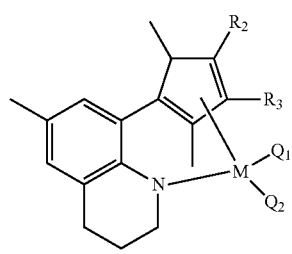
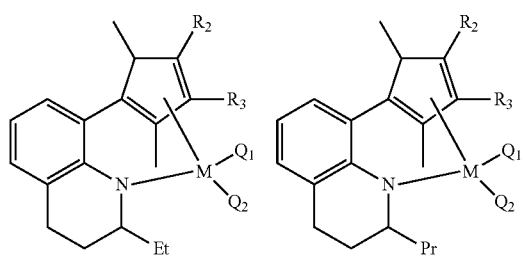
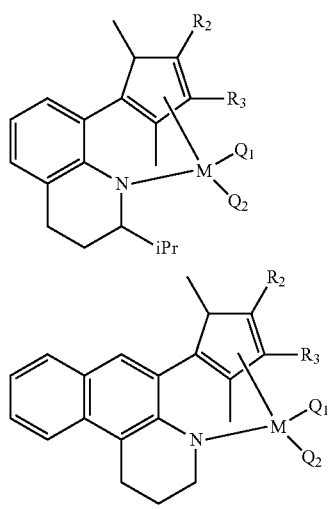
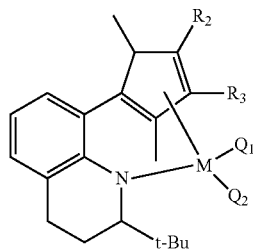
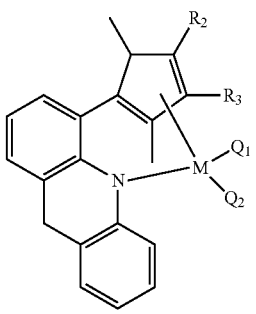
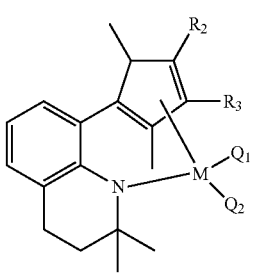
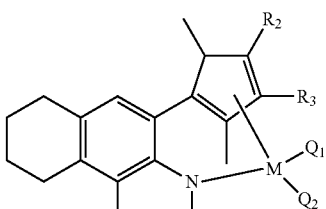
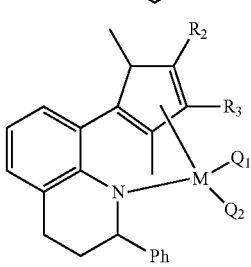

wherein $R_2$ and $R_3$ are the same as or different from each other and are each independently hydrogen or a methyl radical, M is a Group IV transition metal, and $Q_1$ and $Q_2$ are the same as or different from each other and are each independently a methyl radical, a dimethylimido radical, or a chlorine radical.

13. The method of claim 11, wherein the second transition metal compound is one or more selected from the group consisting of the following compounds:

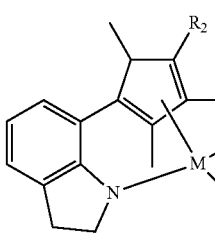
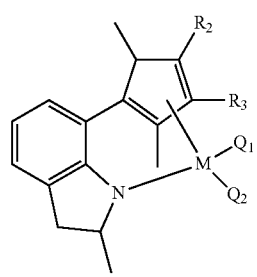

-continued

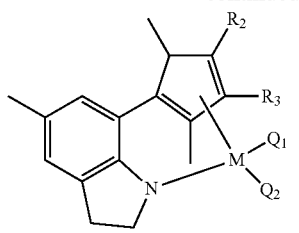

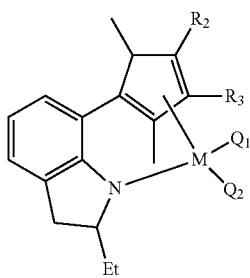

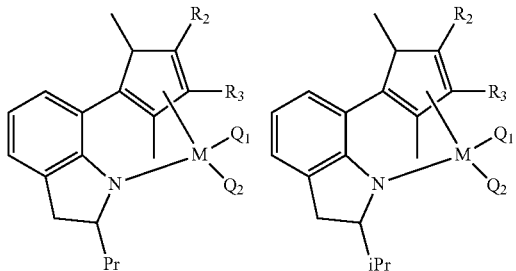

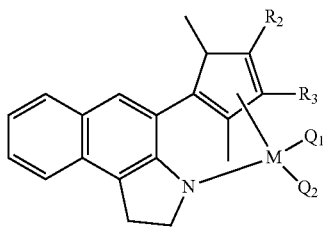

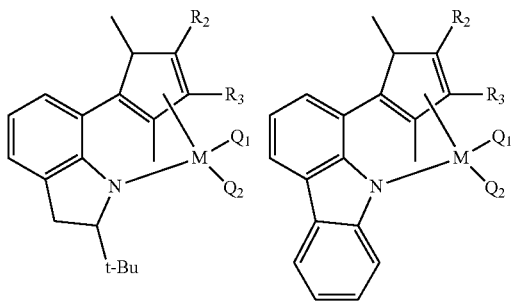

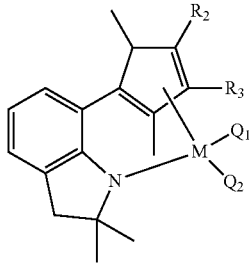

-continued

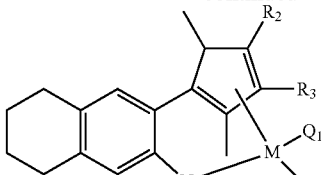

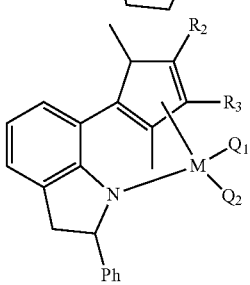

wherein $R_2$ and $R_3$ are the same as or different from each other and are each independently hydrogen or a methyl radical, M is a Group IV transition metal, and $Q_1$ and $Q_2$ are the same as or different from each other and are each independently a methyl radical, a dimethylimido radical, or a chlorine radical.

14. The method of claim 11, wherein the catalytic composition further includes one or more co-catalytic compounds selected from the group consisting of the following Chemical Formula 3, Chemical Formula 4, and Chemical Formula 5:

$$—[Al(R)—O]_n—$$ [Chemical Formula 3]

wherein R's are the same as or different from each other and are each independently a halogen, a hydrocarbon having 1 to 20 carbon atoms, or a halogen-substituted hydrocarbon having 1 to 20 carbon atoms, and n is an integer of 2 or more;

$$D(R)_3$$ [Chemical Formula 4]

wherein R is the same as defined in Chemical Formula 3, and D is aluminum or boron; and $$[L-H]^+[ZA_4]^- \text{ or } [L]^+[ZA_4]^-$$ [Chemical Formula 5]

wherein L is a neutral or cationic Lewis acid, H is a hydrogen atom, Z is an element of Group 13, and A's are the same as or different from each other and are each independently an aryl group having 6 to 20 carbon atoms or an alkyl group having 1 to 20 carbon atoms, in which one or more hydrogen atoms are unsubstituted or substituted with a halogen, a hydrocarbon having 1 to 20 carbon atoms, an alkoxy, or a phenoxy.

15. The method of claim 11, wherein the alpha-olefin is one or more selected from the group consisting of propylene, 1-butene, 1-hexene, and 1-octene, and the diene is one or more selected from the group consisting of 5-ethylidene-2-norbornene, 5-methylene-2-norbornene, and 4-hexadiene.

16. The method of claim 11, wherein copolymerization is performed while continuously feeding the monomer composition, the first and second transition metal compounds, and the cocatalyst in a solution state to a reactor.

17. The method of claim 16, wherein the copolymerization step is continuously performed while continuously discharging the copolymerized elastic terpolymer from the reactor.

18. The method of claim 11, wherein the copolymerization step is performed at a temperature of 100 to 170° C.

* * * * *